United States Patent
Ohara

(10) Patent No.: US 10,730,257 B2
(45) Date of Patent: Aug. 4, 2020

(54) TIRE VULCANIZATION MOLD, TIRE VULCANIZATION DEVICE, AND TIRE PRODUCTION METHOD

(71) Applicant: Toyo Tire Corporation, Itami-shi, Hyogo (JP)

(72) Inventor: Masaaki Ohara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/321,982

(22) PCT Filed: Aug. 12, 2016

(86) PCT No.: PCT/JP2016/003733
§ 371 (c)(1),
(2) Date: Jan. 30, 2019

(87) PCT Pub. No.: WO2018/029730
PCT Pub. Date: Feb. 15, 2018

(65) Prior Publication Data
US 2019/0176420 A1   Jun. 13, 2019

(51) Int. Cl.
B29D 30/06 (2006.01)
B29C 33/02 (2006.01)
B29C 35/02 (2006.01)

(52) U.S. Cl.
CPC .......... B29D 30/0629 (2013.01); B29C 33/02 (2013.01); B29C 35/02 (2013.01);
(Continued)

(58) Field of Classification Search
CPC ............ B29D 30/0606; B29D 30/0629; B29D 2030/0612; B29D 2030/0617
See application file for complete search history.

(56) References Cited

U.S. PATENT DOCUMENTS 6,416,304 B1 *   7/2002   Tanaka .................... B29C 33/10
                                                                          425/28.1
9,616,597 B2 *   4/2017   Chades .............. B29D 30/0606
(Continued)

FOREIGN PATENT DOCUMENTS

JP     61-144309 A     7/1986
JP     62-214907 A     9/1987
(Continued)

OTHER PUBLICATIONS

International Search Report dated Oct. 11, 2016, issued in counterpart International Application No. PCT/JP2016/003733 (2 pages).

*Primary Examiner* — James P Mackey
(74) *Attorney, Agent, or Firm* — Westerman, Hattori, Daniels & Adrian, LLP

(57) ABSTRACT

A tire vulcanization mold disclosed herein includes sectors molding a tread portion of the tire and a pair of upper and lower side plates molding a sidewall portion of the tire. Mold parting lines formed by the sectors and a pair of the upper and lower side plates are located in the tread portion. A lateral groove molding rib molding a lateral groove in the tread portion is provided to bridge from the sector to the side plate and a protrusion molding recess used to mold a protrusion at a groove bottom of the lateral groove is provided to the lateral groove molding rib. Mold parting planes including the mold parting lines are provided to divide the lateral groove molding rib where the protrusion molding recess is not provided. An evacuation path from the protrusion molding recess to the mold parting plane is provided to the lateral groove molding rib.

13 Claims, 9 Drawing Sheets

(52) U.S. Cl.
CPC ............ *B29D 2030/063* (2013.01); *B29D 2030/0612* (2013.01); *B29D 2030/0616* (2013.01); *B29D 2030/0617* (2013.01)

(56) References Cited

U.S. PATENT DOCUMENTS 10,456,952 B2 * 10/2019 Ando ................ B29C 37/0053
2007/0166419 A1    7/2007 Tanaka et al.

FOREIGN PATENT DOCUMENTS

| | | | |
|---|---|---|---|
| JP | 2000-84936 | A | 3/2000 |
| JP | 2001-96538 | A | 4/2001 |
| JP | 2005-231259 | A | 9/2005 |
| WO | WO 98/03357 | * | 1/1998 |

* cited by examiner

TIRE VULCANIZATION MOLD, TIRE VULCANIZATION DEVICE, AND TIRE PRODUCTION METHOD

TECHNICAL FIELD

The present invention relates to a tire vulcanization mold, a tire vulcanization device including the tire vulcanization mold, and a tire production method.

BACKGROUND ART

A tire is produced by preparing an unvulcanized green tire first and then by vulcanizing the green tire while molding the green tire into a predetermined shape by using a tire vulcanization device.

A tire vulcanization device known in the art includes a vulcanization mold used to mold a green tire into a predetermined shape, which includes sectors for forming a tread portion of a tire, and a pair of upper and lower side plates for forming a sidewall portion of the tire.

While the tire vulcanization device is in a mold open state in which the upper side plate and the sectors are spaced apart from the lower side plate, a green tire is set on the lower side plate. Then, by moving down the upper side plate and moving the sectors inward in a tire radial direction, the tire vulcanization device is changed to a mold close state in which the upper side plate and the sectors are in close proximity to the lower side plate. The multiple sectors are divided in a circumferential direction. The sectors are radially separated in the mold open state whereas the sectors gather together and form an annular shape in the mold close state.

A pattern of various rugged shapes is provided to an outer surface of the tread portion and the sidewall portion. A rugged shape continuing from the tread portion to the sidewall portion is provided in some cases to make a design of the tire more sophisticated. In a case where such a pattern is provided, when mold parting lines formed by the sectors and the side plates are disposed to the sidewall portion, rubber squeezed out from the mold parting lines may possibly set at an easy-to-notice spot in outward appearance.

Meanwhile, a technique to dispose mold parting lines formed by the sectors and the side plates to the tread portion is known in the art (see Patent Literatures 1 and 2). With this technique, rubber squeezed out in the easy-to-notice sidewall portion can be limited.

CITATION LIST

Patent Literatures

Patent Literature 1: JP-A-2001-96538
Patent Literature 2: JP-A-2000-84936

SUMMARY OF INVENTION

Technical Problem

A protrusion to prevent, for example, stone trapping is disposed at a groove bottom of a lateral groove in a tread portion in some cases. Such a protrusion may possibly cause a hollow also called a bear formed by an air pocket due to poor discharge of air during vulcanization and molding, which may result in poor molding.

In view of the foregoing problems, the present invention has an object to provide a tire vulcanization mold capable of enhancing moldability of a protrusion disposed at a groove bottom of a lateral groove.

Solution to Problem

A tire vulcanization mold of the preset invention is a tire vulcanization mold used to vulcanize and mold a tire, which includes sectors divided in a tire circumferential direction and molding a tread portion of the tire, and a pair of upper and lower side plates molding a sidewall portion of the tire. Mold parting lines formed by the sectors and a pair of the upper and lower side plates are located in the tread portion. A lateral groove molding rib molding a lateral groove in the tread portion is provided to bridge from the sector to the side plate and a protrusion molding recess used to mold a protrusion at a groove bottom of the lateral groove is provided to the lateral groove molding rib. A mold parting plane including the mold parting line is provided to divide the lateral groove molding rib at a position where the protrusion molding recess is not provided and an evacuation path from the protrusion molding recess to the mold parting plane is provided to the lateral groove molding rib.

In one embodiment, the protrusion molding recess may include multiple protrusion molding recesses which are provided to the lateral groove molding rib and the mold parting plane may be set to pass a space between the protrusion molding recesses situated adjacently, and the evacuation path may be provided at least from one protrusion molding recess to the mold parting plane. In such a case, the evacuation path may be provided from the protrusion molding recesses on both sides of the mold parting plane to the mold parting plane. The evacuation path may be a cylindrical hollow. The evacuation path may be a conical hollow. The evacuation path may be of a slit shape. A distance from the protrusion molding recess to the mold parting plane may be 5 mm or less.

A tire vulcanization device of the present invention includes any one of the tire vulcanization molds configured as above, a segment fixed to the sector and moving the sector in a tire radial direction, and a pair of upper and lower attachment plates fixed to a pair of the upper and lower side plates, respectively, and supporting the segment in a slidable manner.

In one embodiment, the tire vulcanization device may be configured in such a manner that the segment includes a pair of upper and lower sliding surfaces sliding on a pair of the upper and lower attachment plates, respectively, a pair of the upper and lower sliding surfaces inclines toward a center in a tire width direction more on an outer side in a tire radial direction, and when the segment moves the sector outward in the tire radial direction, a pair of the upper and lower sliding surfaces slides on a pair of the upper and lower attachment plates, respectively, and spacings at the mold parting planes widen. In such a case, the mold parting planes may be provided parallel to the tire radial direction.

A tire production method of the present invention includes a forming step of forming a green tire, and a vulcanizing step of vulcanizing and molding the green tire by using the tire vulcanization device configured as above.

Advantageous Effects of Invention

According to the embodiments above, the mold parting plane defined by the sector and the side plate is provided at position other than a position of the protrusion molding recess and in addition to this configuration, the evacuation path from the protrusion molding recess to the mold parting plane is provided. Owing to this configuration, air in the protrusion molding recess can be discharged by using the mold parting plane. Consequently, moldability of the protrusion at the groove bottom can be enhanced.

DESCRIPTION OF EMBODIMENTS

Hereinafter, embodiments of the present invention will be described with reference to the drawings.

Figure 1:
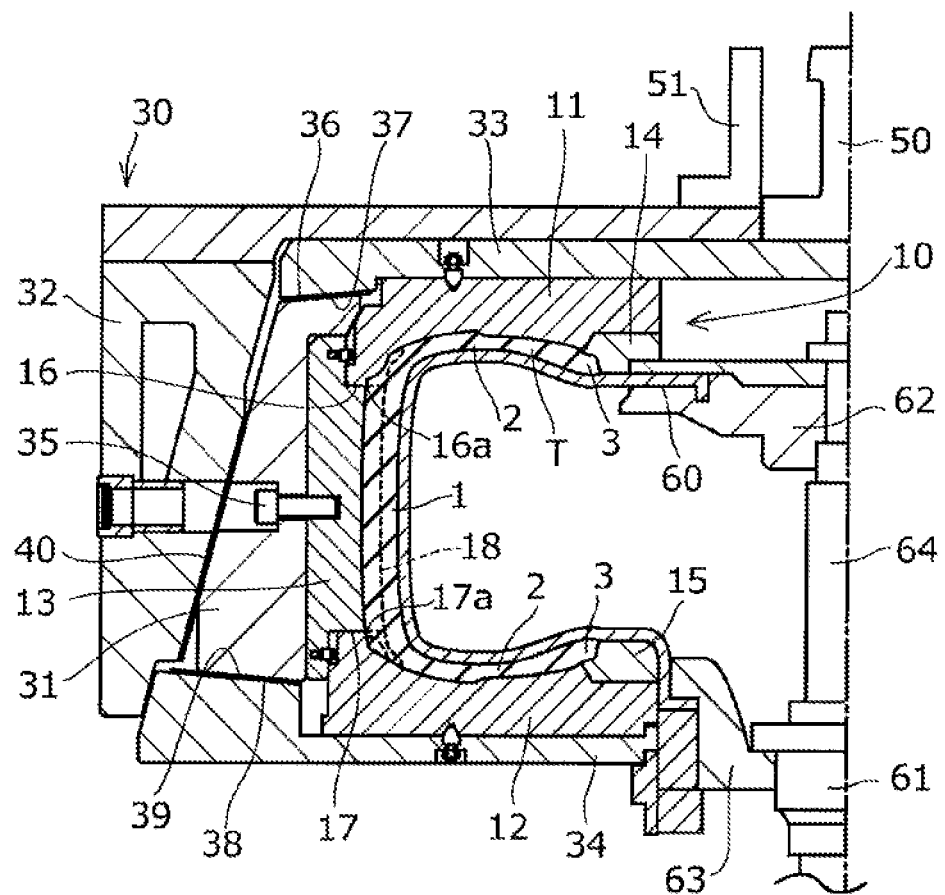
FIG. 1 is a half sectional view showing a tire vulcanization device according to one embodiment during vulcanization.

As is shown in FIG. 1, a tire vulcanization device includes a tire vulcanization mold (hereinafter, referred to simply as a vulcanization mold) 10, a container 30 to which the vulcanization mold 10 is attached, first lifting means 50 and second lifting means 51 which lift the vulcanization mold 10 and the container 30 up and down, and a bladder 60. The tire vulcanization device vulcanizes an unvulcanized green tire set with a tire axial direction aligned in a top-bottom direction while molding the green tire into a predetermined shape by heating and application of pressure.

The vulcanization mold 10 is a mold which includes a pair of an upper side plate 11 and a lower side plate 12, multiple sectors 13 divided in a circumferential direction, and a pair of upper and lower bead rings 14 and 15, and forms an outer surface (design surface) of a tire T. The vulcanization mold 10 can be made of a metal material, such as aluminum, aluminum alloy, and iron.

The sectors 13 are a mold which molds a tread portion 1 of the tire T. The multiple (for example, nine) sectors 13 are divided in a tire circumferential direction and allowed to undergo displacement radially (in a tire radial direction) by expansion and contraction. In a mold close state in which the respective sectors 13 are disposed at mold closing positions, the sectors 13 situated adjacently in the tire circumferential direction gather together and form an annular shape.

The upper side plate 11 is a mold which molds a sidewall portion 2 and a bead portion 3 disposed on an upper side of the tire T. The lower side plate 12 is a mold which molds a sidewall portion 2 and a bead portion 3 disposed on a lower side. The bead rings 14 and 15 are provided respectively, on an inside of the upper side plate 11 and the lower side plate 12 in the tire radial direction. The bead rings 14 and 15 are formed for the bead portions 3 of the tire T to fit in.

The vulcanization mold 10 includes parting lines of a coupled mold which divide the mold in a tire width direction, to be more specific, a mold parting line 16a formed by the sectors 13 and the upper side plate 11 and a mold parting line 17a formed by the sectors 13 and the lower side plate 12, The mold parting lines 16a and 17a are located in the tread portion 1 of the tire T. Hence, the vulcanization mold 10 is configured to separate the sectors 13 from a pair of the upper and lower side plates 11 and 12 in the tire width direction in a tread surface.

Both of mold parting planes including the mold parting lines 16a and 17a, to be more specific, a mold parting plane 16 which is a coupled surface of the sectors 13 and the upper side plate 11 and a mold parting plane 17 which is a coupled surface of the sectors 13 and the lower side plate 12 extend outward in the tire radial direction from the mold parting lines 16a and 17a, respectively. Herein, both of the mold parting planes 16 and 17 are provided parallel (that is, horizontal) to the tire radial direction in which the sectors 13 move. The mold parting lines 16a and 17a are parting lines located at inner ends of the mold parting planes 16 and 17, that is, at ends facing a cavity.

Figure 3:
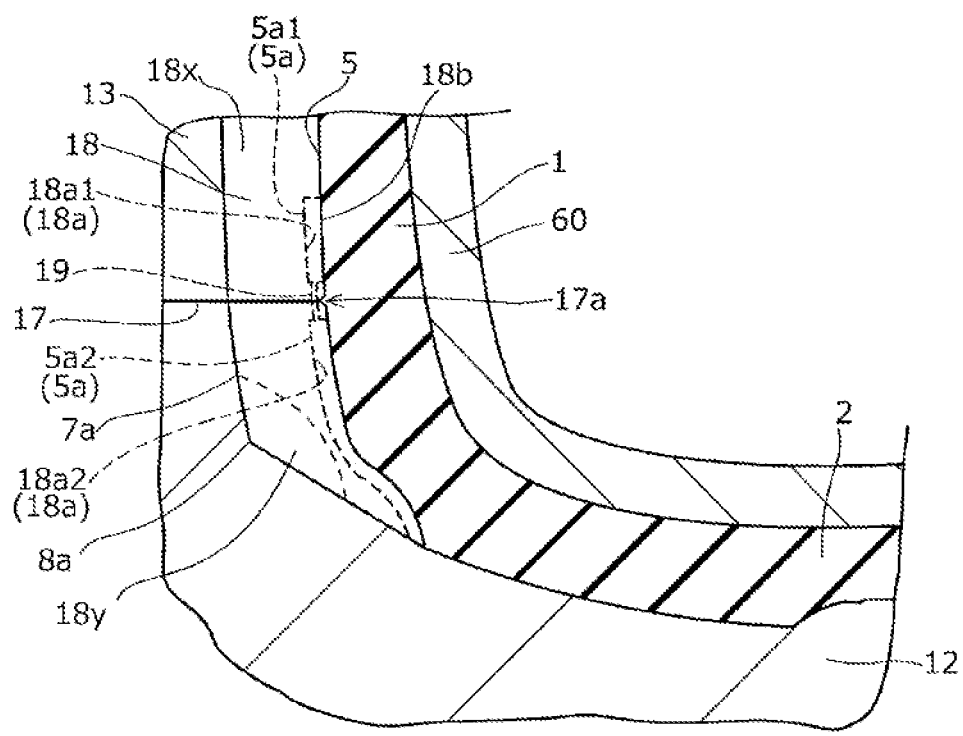
FIG. 3 is a sectional view taken along the line III-III of FIG. 2 during tire vulcanization.

The vulcanization mold 10 is provided with a main groove molding rib (not shown) used to mold a main groove extending in the tire circumferential direction in the tread portion 1 and a lateral groove molding rib 18 used to mold a lateral groove extending in the tire width direction in the tread portion 1 (see FIG. 3). The lateral groove molding rib 18 is provided to bridge from the sectors 13 to the side plates 11 and 12. Also, the lateral groove molding rib 18 is provided with a protrusion molding recess 18a used to mold a protrusion at a groove bottom of the lateral groove.

Figure 2:
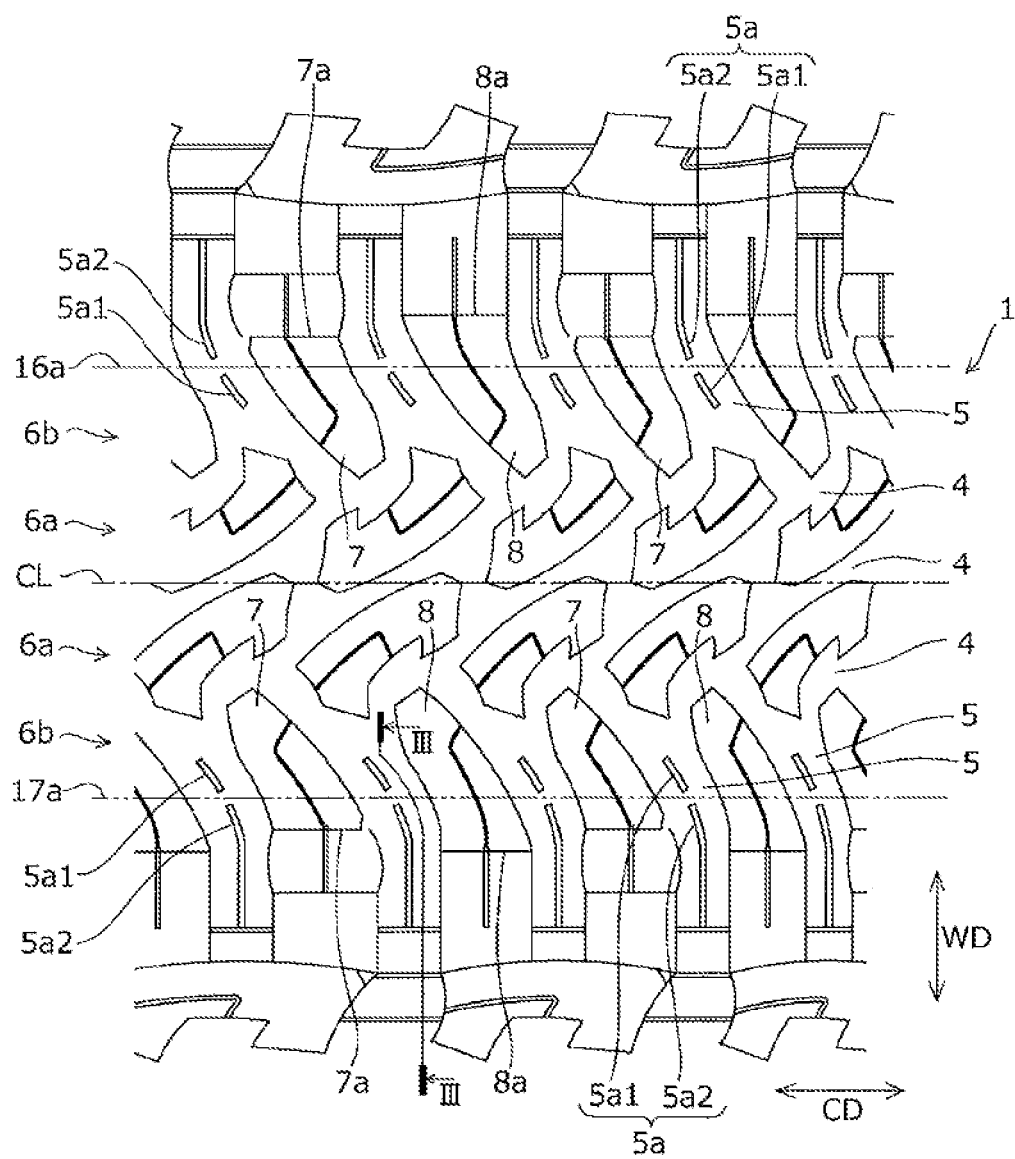
FIG. 2 is a plan view of a tread pattern of the embodiment.

FIG. 2 is a view showing an example of a tread pattern. The tread portion 1 includes multiple blocks divided by main grooves 4 extending in the tire circumferential direction while bending and lateral grooves 5 crossing the main grooves 4. In FIG. 2, the tire circumferential direction is a direction indicated by an arrow CD and the tire width direction is a direction indicated by an arrow WD. An inner side in the tire width direction (that is, on a side closer to a center) means a direction coming closer to a tire equator CL and an outer side in the tire width direction means a direction moving away from the tire equator CL.

The tread portion 1 has a pair of center block rows 6a and 6a located in a center region including the tire equator CL, and a pair of shoulder block rows 6b and 6b located in shoulder regions on both sides of the center block rows 6a and 6a. The shoulder regions mean regions located at ends of the tread portion in the tire width direction, in other words, regions sandwiched between the main grooves and tire contact ends and including the tire contact ends.

The shoulder block row 6b is formed by providing a first land portion (block) 7 having a first tread end 7a and a second land portion (block) 8 having a second tread end 8a located on the outer side than the first tread end 7a in the tire width direction alternately in the tire circumferential direction.

As are shown in FIG. 2 and FIG. 3, a protrusion 5a to prevent stone trapping called a stone ejector is provided at a groove bottom of the lateral groove 5 dividing the first land portion 7 and the second land portion 8. The protrusion 5a is a streak of protrusion rising from the groove bottom and extending along a length direction of the lateral groove 5 in a center of the lateral groove 5 in the width direction, in short, a protruding strip. The protrusion 5a is spaced apart from side surfaces of the land portions 7 and 8 on the both sides. In each lateral groove 5, multiple protrusions 5a are provided at an interval in the length direction. Herein, a first protrusion 5a1 and a second protrusion 5a2 located on an outer side than the first protrusion 5a1 in the tire width direction and longer than the first protrusion 5a1 are provided.

Figure 4:
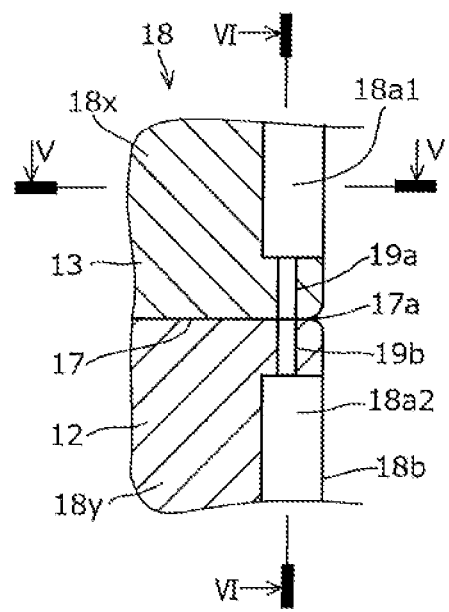
FIG. 4 is an enlarged sectional view of a major portion of a lateral groove molding rib.
Figure 5:
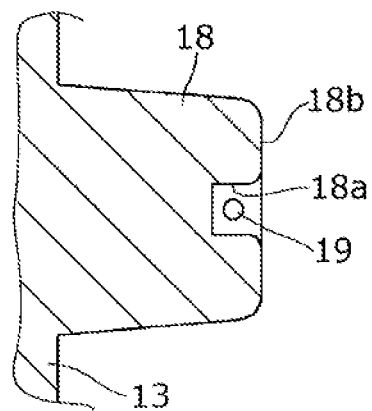
FIG. 5 is a sectional view taken along the line V-V of FIG. 4.

The lateral groove molding rib 18 is a rib to mold the lateral groove dividing the first land portion 7 and the second land portion 8. As are shown in FIG. 3 through FIG. 5, the lateral groove molding rib 18 is provided with the protrusion molding recess 18a used to mold the protrusion 5a in a top face 18b. The protrusion molding recess 18a is formed in the shape of a groove extending in a length direction of the lateral groove molding rib 18.

Each lateral groove molding rib 18 is provided with multiple protrusion molding recesses 18a at an interval in the length direction. Herein, a first recess 18a1 molding the first protrusion 5a1 and a second recess 18a2 located on an outer side than the first recess 18a1 in the tire width direction and molding the second protrusion 5a2 are provided.

Figure 6:
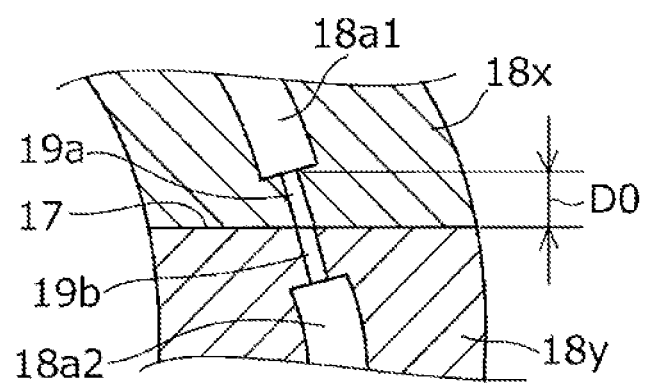
FIG. 6 is a sectional view taken along the line VI-VI of FIG. 4.

In the present embodiment, the mold parting planes 16 and 17 are set to divide the lateral groove molding rib 18 at a position where the protrusion molding recesses 18a are not provided. Herein, as are shown in FIG. 3, FIG. 4, and FIG. 6, the mold parting plane 17 is set to pass a space between the protrusion molding recesses 18a situated adjacently in the tire width direction, that is, a space between the first recess 18a1 and the second recess 18a2. The mold parting plane 17 passes a center of the space between the first recess 18a1 and the second recess 18a2. Although an illustration is omitted herein, the same can be said for the mold parting plane 16. Hence, as is shown in FIG. 2, the mold parting lines 16a and 17a not only traverse the first land portion 7 and the second land portion 8 of the shoulder block row 6b but also traverse the lateral groove 5 at a position at which the mold parting lines 16a and 17a do not cross the protrusion 5a in the shoulder regions of the tread portion 1. To be more specific, the mold parting lines 16a and 17a pass a space between the first protrusion 5a1 and the second protrusion 5a2. The mold parting lines 16a and 17a extend parallel to the tire circumferential direction along an entire circumference and distances from the tire equator CL to the respective mold parting lines 16a and 17a are set to be constant along the entire circumference.

As is shown in FIG. 3, the lateral groove molding rib 18 provided to bridge from the sectors 13 to the lower side plate 12 is divided by the mold parting plane 17. Likewise, the lateral groove molding rib 18 provided to bridge from the sectors 13 to the upper side plate 11 is divided by the mold parting plane 16. Hence, the lateral groove molding rib 18 is formed of a first rib portion 18x provided to the sectors 13, and a second rib portion 18y provided to the respective side plates 11 and 12, and formed by joining the first rib portion 18x and the second rib portion 18y in the mold parting planes 16 and 17. Herein, the first recess 18a1 is provided to the first rib portion 18x and the second recess 18a2 is provided to the second rib portion 18y.

In the present embodiment, the lateral groove molding rib 18 is provided with an evacuation path 19 from the protrusion molding recess 18a to the mold parting planes 16 and 17 (see FIGS. 3 through 6). Herein, two evacuation paths 19a and 19b from protrusion molding recesses on the both sides of the mold parting planes 16 and 17, that is, from the first recess 18a1 and the second recess 18a2 to the mold parting planes 16 and 17, respectively are provided.

The evacuation path 19 is a hole penetrating from an end face of the protrusion molding recess 18a facing the mold parting planes 16 and 17 to the mold parting planes 16 and 17. Herein, the evacuation path 19 is a cylindrical hollow. As are shown in FIG. 4 and FIG. 6, a pair of the evacuation paths 19a and 19b provided on the both sides of the mold parting planes 16 and 17 is allowed to communicate by matching opening positions in the mold parting planes 16 and 17. Herein, opening shapes are superimposed one on the other.

Herein, as are shown in FIG. 2 and FIG. 6, the lateral groove 5 inclines with respect to the tire width direction, and in response to this configuration, the protrusion 5a and the protrusion molding recess 18a also incline with respect to the tire width direction. The evacuation path 19 is provided to incline with respect to the tire width direction along a length direction of the lateral groove 5. However, the evacuation path 19 may be provided parallel to the tire width direction, that is, perpendicularly to the mold parting planes 16 and 17.

A length of the evacuation path 19, that is, a distance D0 from the protrusion molding recess 18a to the mold parting planes 16 and 17 is preferably 5 mm or less in limiting a clogging of the evacuation path 19. That is, it is preferable to set the mold parting planes 16 and 17 in the vicinity of the protrusion molding recess 18a for the evacuation path 19 not to become longer than necessary.

The container 30 includes multiple segments 31 to bold the sectors 13, a jacket ring. 32 for moving the segments 31 in the tire radial direction, an upper attachment plate 33 supporting the upper side plate 11 and the upper bead ring 14 and disposed on an upper side of the segments 31, and a lower attachment plate 34 supporting the lower side plate 12 and the lower bead ring 15 and disposed on a lower side of the segments 31.

The segments 31 are provided on the outside of the sectors 13 in the tire radial direction in a one-to-one correspondence with the divided sectors 13. The respective segments 31 are fixed to the corresponding sectors 13 with bolts 35.

On a top surface of the segment 31, an upper sliding surface 36 inclined toward a center in the tire width direction more on the outer side in the tire radial direction (that is, downward) is provided. The upper sliding surface 36 slides on an upper slide 37 provided to the upper attachment plate 33. On a bottom surface of the segment 31, a lower sliding surface 38 inclined toward the center in the tire width direction more on the outer side in the tire radial direction (that is, upward) is provided. The lower sliding surface 38 slides on a lower slide 39 provided to the lower attachment plate 34.

An angle of inclination of the upper sliding surface 36 and the lower sliding surface 38 is not particularly limited. However, an angle in a range of 5° to 10° both inclusive is preferable as the angle of inclination with respect to the tire radial direction. The upper sliding surface 36 and the lower sliding surface 38 provided to the segment 31 are preferably formed of planes having no curve and slide, respectively, on the upper slide 37 and the lower slide 39 in a surface-contact state.

A side surface of the segment 31 on an opposite side to the side surface where the sector 13 is attached (on the outer side in the tire radial direction) forms an inclined surface 40 which inclines downward and outward in the tire radial direction.

The jacket ring 32 is an annular member provided on the outside of the multiple segments 31 in the radial direction. An inner peripheral surface of the jacket ring 32 inclines along the inclined surface 40 of the segment 31 provided on the outer side in the tire radial direction, and is attached to the inclined surface 40 in a slidable manner. The jacket ring 32 moves the segments 31 in the tire radial direction as the jacket ring 32 slides on the inclined surface 40 by moving up and down relatively with respect to the segments 31. The sectors 13 are thus allowed to undergo displacement in the tire radial direction by expansion and contraction.

The upper side plate 11 and the upper slide 37 are fixed to a bottom surface of the upper attachment plate 33. The upper slide 37 is disposed on the outside of the upper side plate 11 in the tire radial direction at a position at which the upper slide 37 opposes the upper sliding surface 36 provided to the top surface of the segment 31 and supports the segment 31 in a slidable manner in the tire radial direction.

The lower side plate 12 and the lower slide 39 are fixed to a top surface of the lower attachment plate 34. The lower slide 39 is disposed on the outside of the lower side plate 12 in the tire radial direction at a position at which the lower slide 39 opposes the lower sliding surface 38 provided to the bottom surface of the segment 31 and supports the segment 31 in a slidable manner in the tire radial direction.

The first lifting means 50 lifts the upper attachment plate 33 up and down relatively with respect to the lower attachment plate 34. The second lifting means 51 lifts the jacket ring 32 up and down separately from the segments 31 supported on the upper attachment plate 33.

The bladder 60 is formed of an expandable and contractable rubber elastic body of a toroidal shape in which an axial center swells outward. The bladder 60 is set on an inner surface side of the green tire and swells with a supply of a pressurized gas (for example, steam or a nitrogen gas) and thereby applies a pressure to the green tire from inside. The bladder 60 is supported by an extendable support portion 61 at an upper end and a lower end which are both ends in an axial direction. The extendable support portion 61 includes an upper clamp ring 62 fixing the upper end of the bladder 60, a lower clamp ring 63 fixing the lower end of the bladder 60, and an extendable shaft 64 capable of extending and retracting.

A production method of a pneumatic tire using the tire vulcanization device configured as above will now be described. To produce a pneumatic tire, a green tire is formed by any method known in the art and the green tire is vulcanized and molded by using the tire vulcanization device described above.

Figure 7:
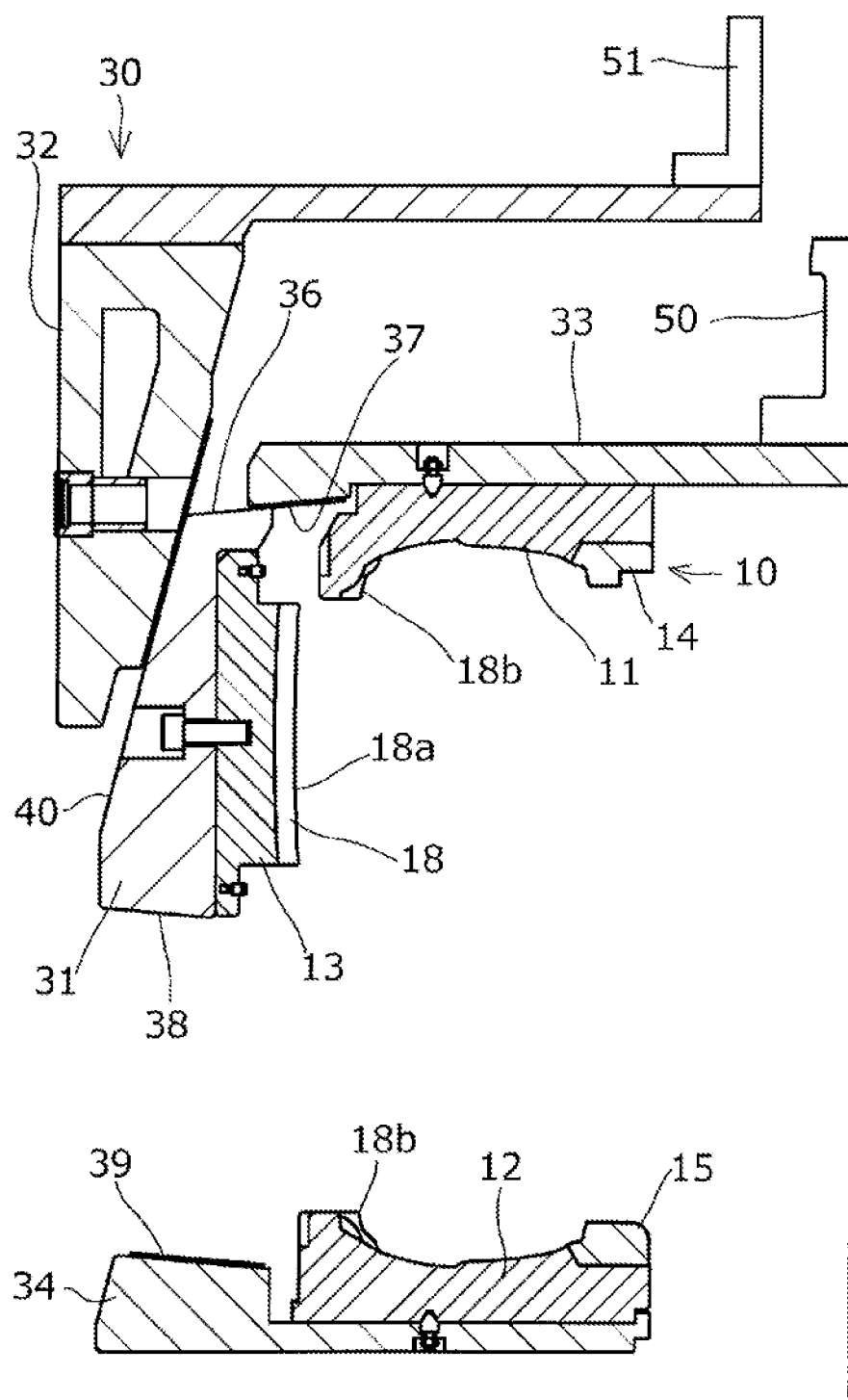
FIG. 7 is a view used to describe an opening and closing action of the tire vulcanization device.
Figure 8:
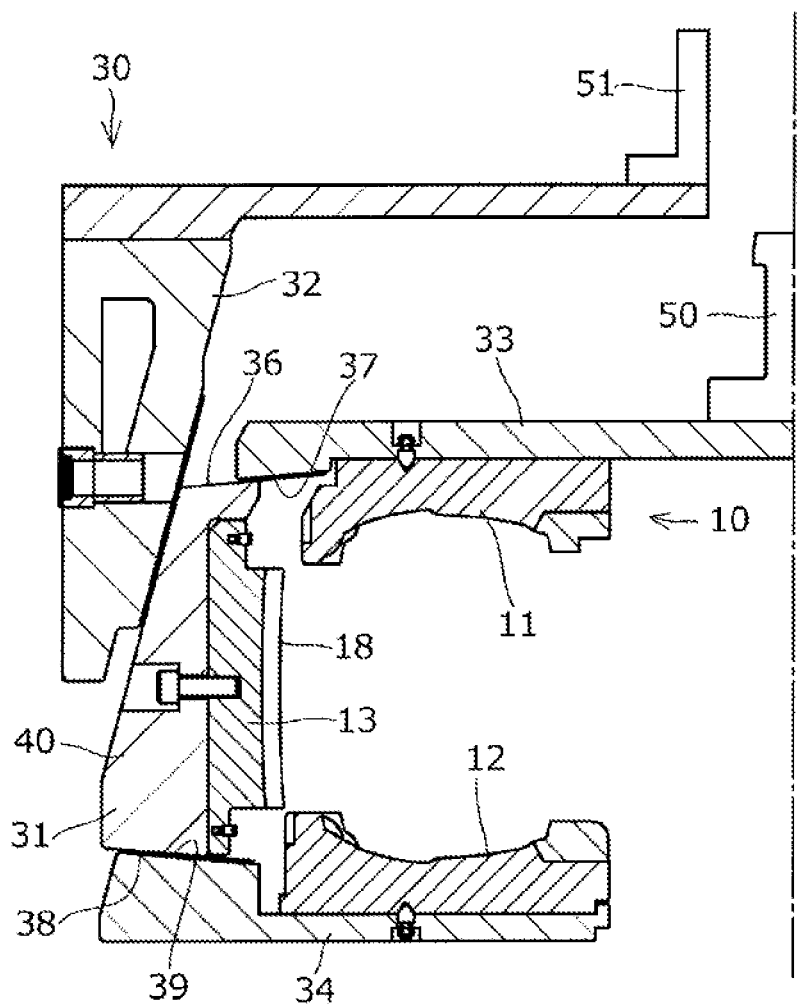
FIG. 8 is another view used to describe the opening and closing action of the tire vulcanization device.
Figure 9:
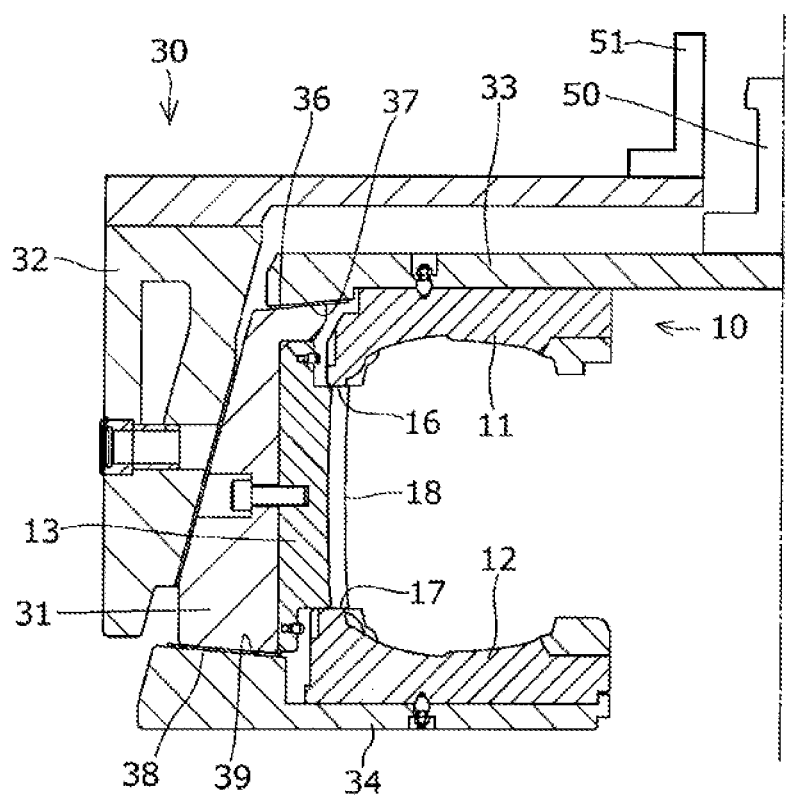
FIG. 9 is still another view used to describe the opening and closing action of the tire vulcanization device.

FIG. 7 through FIG. 9 are views used to describe an opening and closing action of the tire vulcanization device and the green tire and the bladder 60 are omitted from each drawing.

In a vulcanizing step, the green tire is attached to the vulcanization mold 10 of the tire vulcanization device in a mold open state and the bladder 60 is attached on the inner surface side of the green tire. FIG. 7 shows a mold open state in which the sector 13 and the upper side plate 11 are at positions spaced above the fixed lower side plate 12. In this state, the green tire is attached to the lower side plate 12 and then the container 30 is moved down. More specifically, by moving down the first lifting means 50, the upper side plate 11 and the sector 13 provided to the upper attachment plate 33 are moved down, that is, moved toward the lower side plate 12.

When the segment 31 makes contact with the lower attachment plate 34 as is shown in FIG. 8, the sector 13 held by the segment 31 is moved inward in the tire radial direction by lifting the jacket ring 32 down by using the second lifting means 51 as is shown in FIG. 9.

In this instance, the segment 31 moves inward in the tire radial direction as the lower sliding surface 38 slides on the lower slide 39 of the lower attachment plate 34 and the upper sliding surface 36 slides on the upper slide 37 of the upper attachment plate 33. The upper sliding surface 36 and the lower sliding surface 38 incline toward the center in the tire width direction more on the outer side in the tire radial direction. Hence, when the sector 13 together with the segment 31 moves inward in the tire radial direction, the upper side plate 11 moves down due to the inclination of the upper sliding surface 36 and the sector 13 moves down due to the inclination of the lower sliding surface 38.

Accordingly, a distance between the upper side plate 11 and the lower side plate 12 becomes shorter as the segment 31 moves inward in the tire radial direction. Spacings at the mold parting planes 16 and 17 defined by the sector 13 and the respective upper and lower side plates 11 and 12 vanish for the first time when the mold close state shown in FIG. 1 is achieved. That is, while the sectors 13 are moving inward in the tire radial direction, a clearance is still left at the mold parting plane 16 defined by the sectors 13 and the upper side plate 11. Also, a clearance is still left at the mold parting plane 17 defined by the sectors 13 and the lower side plate 12. These clearances at the mold parting planes 16 and 17 vanish when a diameter of the sectors 13 is fully reduced.

By changing the vulcanization mold 10 to the mold close state shown in FIG. 1 in the manner as above and swelling the bladder 60 with a pressurized gas supplied inside, the green tire is pressurized and heated between the vulcanization mold 10 and the bladder 60 and the green tire is vulcanized and molded to a tire T by being maintained in the state above for a predetermined time.

After the green tire is vulcanized, the vulcanization mold 10 is changed to a mold open state to perform a removing step of removing the vulcanized tire T from the tire vulcanization device. The vulcanization mold 10 is changed from the mold close state to the mold open state by performing the mold closing action inversely.

More specifically, the sector 13 held by the segment 31 is moved outward in the tire radial direction by lifting the jacket ring 32 up by using the second lifting means 51. In this instance, when the segment 31 moves outward in the tire radial direction as is shown in FIG. 9, the upper sliding surface 36 slides outward in the tire radial direction on the upper slide 37 attached to the upper attachment plate 33 while pushing up the upper attachment plate 33. Meanwhile, the lower sliding surface 38 slides outward in the tire radial direction by climbing up the lower slide 39 attached to the lower attachment plate 34.

Figure 10:
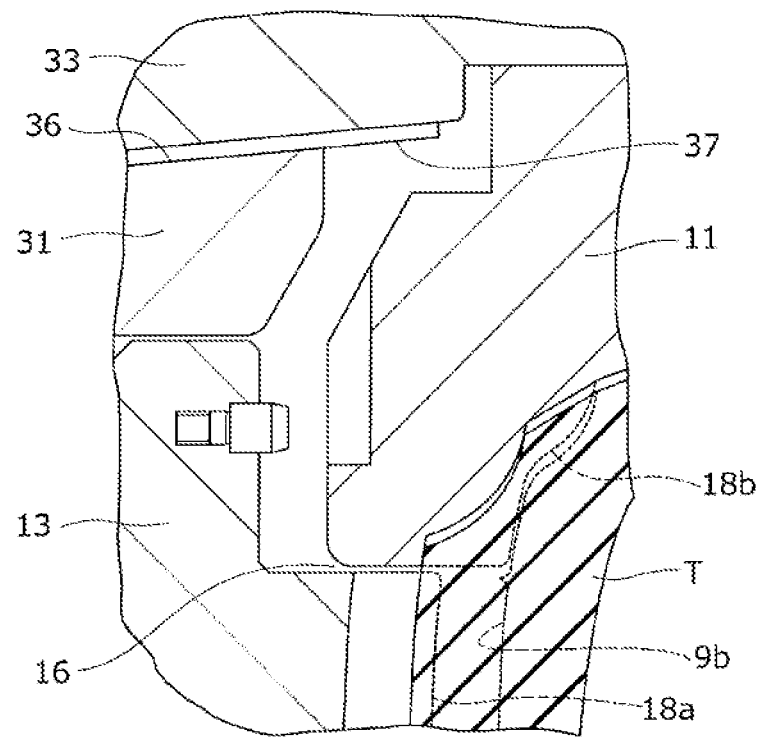
FIG. 10 is an enlarged view of a major portion of FIG. 9.

The upper attachment plate 33 pushed up by the upper sliding surface 36 moves upward with respect to the segment 31. Hence, when the segment 31 starts to move radially outward, as is shown in FIG. 10, the upper side plate 11 also moves upward with respect to the segment 31. Hence, a spacing at the mold parting plane 16 defined by the sector 13 and the upper side plate 11 increases.

Figure 11:
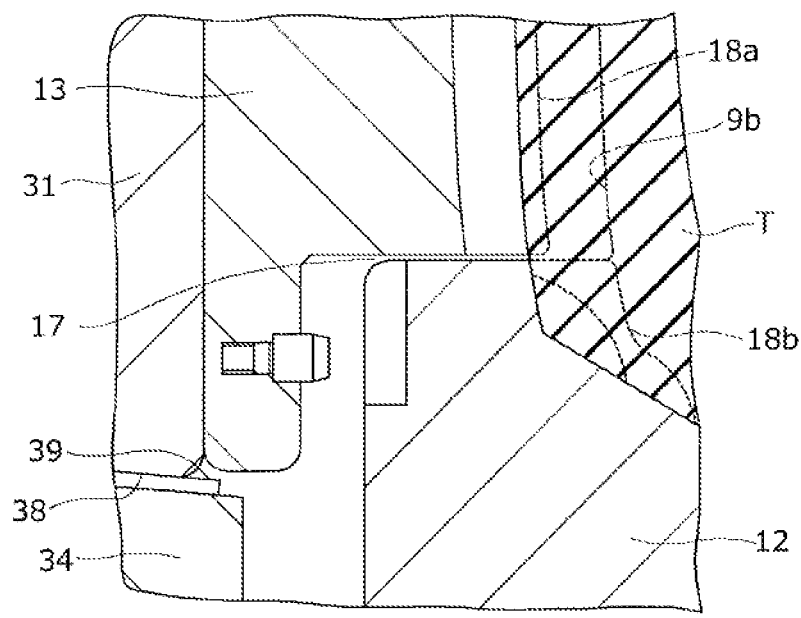
FIG. 11 is another enlarged view of the major portion of FIG. 9.

Meanwhile, in the lower sliding surface 38, when the segment 31 starts to move radially outward, as is shown in FIG. 11, the segment 31 moves upward with respect to the fixed lower attachment plate 34. Hence, a spacing at the mold parting plane 17 defined by the sector 13 and the lower side plate 12 increases.

After the diameter of the sectors 13 is fully increased as is shown in FIG. 8, the first lifting means 50 is moved up to move the upper side plate 11 and the sector 13 apart from the lower side plate 12 as is shown in FIG. 7. The vulcanized tire T is then removed from the tire vulcanization device changed to the mold open state.

According to the present embodiment, as has been described, by providing the evacuation path 19 from the protrusion molding recess 18a molding the protrusion 5a at the groove bottom to the mold parting planes 16 and 17, air in the protrusion mold recess 18a can be discharged from the mold parting planes 16 and 17 through the evacuation path 19 when the vulcanization mold 10 is closed. In particular, in the present embodiment, spacings at the mold parting planes 16 and 17 are ensured until just before a mold closing action is completed due to inclinations of the upper sliding surface 36 and the lower sliding surface 38, and the evacuation path 19 opens to the spacings. Hence, air can be evacuated more effectively. Consequently, moldability can be enhanced by limiting a bear caused by the protrusion 5a.

The mold parting planes 16 and 17 are set to pass a space between the protrusion molding recesses 18a1 and 18a2 situated adjacently and in addition to this configuration, the evacuation paths 19a and 19b, respectively, from the protrusion molding recesses 18a1 and 18a2 on the both sides to the mold parting planes 16 and 17 are provided. Hence, moldability can be enhanced for both of the protrusions 5a1 and 5a2 situated adjacently in the tire width direction.

According to the present embodiment, when the segment 31 starts to move radially outward, spacings at the mold parting planes 16 and 17 defined by the sectors 13 and the upper side plate 11 and the lower side plate 12, respectively, increase owing to the inclinations of the upper sliding surface 36 and the lower sliding surface 38. Accordingly, even when the tire vulcanization device is repetitively opened and closed, rubbing of the mold parting planes 16 and 17 do not occur and spacings at the mold parting planes 16 and 17 can be maintained at an appropriate value. Durability of the tire vulcanization device can be thus enhanced. Moreover, the upper side plate 11 moves in a direction to separate from the vulcanized and molded tire T as soon as the segment 31 starts to move radially outward. Hence, the tire T can be readily released from the mold.

In the tire vulcanization device of the present embodiment, when the upper sliding surface 36 and the lower sliding surface 38 provided to the segment 31 are planes sliding, respectively, on the upper slide 37 and the lower slide 39 in a surface-contact state, the segment 31 is allowed to move with high positional accuracy without rattling. Misalignment of the sector 13 in a mold closed state can be thus limited.

In the present embodiment, the mold parting planes 16 and 17 are provided parallel to the tire radial direction. However, the mold parting planes 16 and 17 may be provided to incline diagonally with respect to the tire radial direction. That is, the mold parting planes 16 and 17 may be provided to incline to the outer side in the tire width direction more on the outer side in the tire radial direction. In such a case, too, a tire can be readily released from the mold owing to the inclinations of the upper sliding surface 36 and the lower sliding surface 38. In addition, in the event that the sliding surfaces 36 and 38 wear out due to repetitive mold opening and closing actions and an interval between the upper side plate 11 and the lower side plate 12 becomes narrower, the mold can be closed by gradually narrowing an interval between the upper side plate 11 and the lower side plate 12 in association with a movement of the segment 31 in the tire radial direction. Hence, rubbing of the mold parting planes 16 and 17 at an early stage can be limited, which can in turn enhance durability.

Figure 12:
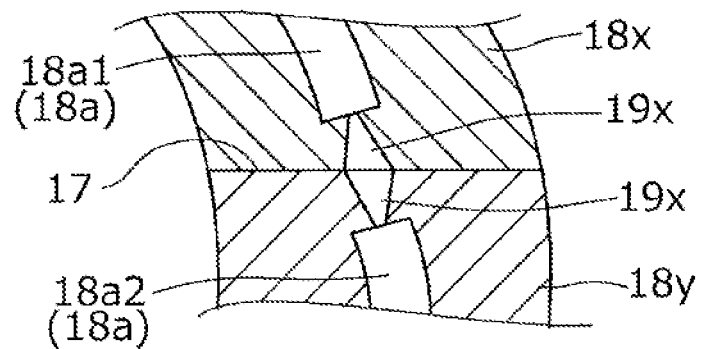
FIG. 12 is an enlarged sectional view of a major portion of a lateral groove molding rib according to another embodiment.

FIG. 12 is a view showing a cross section of a major portion of a lateral groove molding rib 18 in a tire vulcanization device according to a second embodiment. The second embodiment is different from the first embodiment above having the sectional structure shown in FIG. 6 in a shape of an evacuation path 19 provided to the lateral groove molding rib 18.

That is, an evacuation path 19x of the second embodiment is a conical hollow. The evacuation path 19x is of an inverse tapered shape with a diameter gradually increasing from a protrusion molding recess 18a toward mold parting planes 16 and 17. As with the first embodiment above, a pair of evacuation paths 19x and 19x provided on the both sides of the mold parting planes 16 and 17 is allowed to communicate by matching opening positions in the mold parting planes 16 and 17 and opening shapes are superimposed one on the other.

When the evacuation path 19x is of a conical shape as above, a tire can be readily cut at a small-diameter portion when removed from a vulcanization mold 10 and a cutting position can be maintained constant. In particular, when the evacuation path 19x is of an inverse tapered shape with a diameter gradually increasing from the protrusion molding recess 18a toward the mold parting planes 16 and 17, a tire can be cut at a boundary position between the protrusion molding recess 18a and the evacuation path 19x and chipping of the protrusion 5a can be limited. Also, in the case of the inverse tapered shape, the evacuation path 19x can be readily formed from the mold parting planes 16 and 17 with a drill when the vulcanization mold 10 is produced. Other configurations and advantageous effects of the second embodiment are same as the configurations and the advantageous effects of the first embodiment above and a description is omitted herein.

Figure 13:
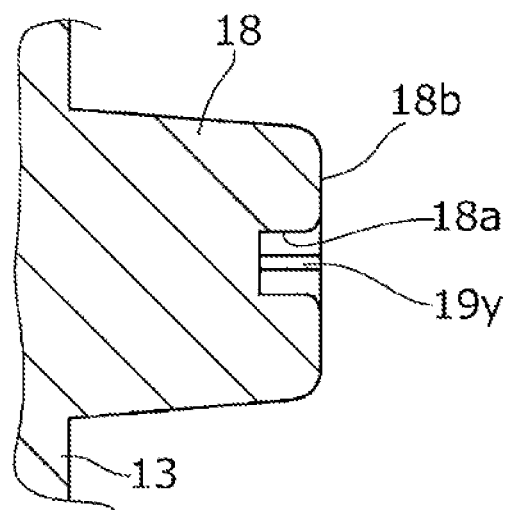
FIG. 13 is a sectional view of a lateral groove molding rib according to still another embodiment.

FIG. 13 is a view showing a cross section of a lateral groove molding rib 18 in a vulcanization device according to a third embodiment. The third embodiment is different from the first embodiment above in that a slit-shaped evacuation path 19y is provided as an evacuation path 19.

That is, the evacuation path 19y of the third embodiment is formed in the shape of a slit extending from an end face of a protrusion molding recess 18a facing the mold parting planes 16 and 17 to the mold parting planes 16 and 17. A height of the slit-shaped evacuation path 19y is set equal to a depth of the protrusion molding recess 18a.

In this manner, a shape of the evacuation path 19 from the protrusion molding recess 18a to the mold parting planes 16 and 17 is not particularly limited and various shapes can be adopted. Other configurations and advantageous effects of the third embodiment are same as the configurations and the advantageous effects of the first embodiment above and a description is omitted herein.

In the embodiments above, the evacuation paths 19 are provided to the protrusion molding recess 18a1 and 18a2 on the both sides of the mold parting planes 16 and 17. However, the evacuation path 19 may be provided to either one of the protrusion molding recesses 18a. The present invention is not necessarily limited to a case where multiple protrusion molding recess 18a are provided. Only a single protrusion molding recess may be provided to each lateral groove molding rib and an evacuation path from the single protrusion molding recess to the mold parting plane may be provided.

A tire referred to in the present embodiment includes a tire designed for an automobile, a heavy load tire designed for a thick, a bus, and a light truck (for example, a SUV or a pickup truck), and a pneumatic tire designed for various types of vehicles.

The embodiments above are presented as examples and have no intention to limit the scope of the invention. These novel embodiments can be implemented in various other manners and various omissions, replacements, and changes can be made within the spirit and scope of the invention.

REFERENCE SIGNS LIST

1: tread portion, 2: sidewall portion, 3: bead portion, 5: lateral groove. 5a: protrusion, 10: vulcanization mold, 11: upper side plate, 12: lower side plate, 13: sector, 16 and 17: mold parting planes, 18: lateral groove molding rib, 18a: protrusion molding recess, 19, 19x, and 19y: evacuation path, 31: segment, 33: upper attachment plate, 34: lower attachment plate, 36: upper sliding surface, 38: lower sliding surface

The invention claimed is:

1. A tire vulcanization mold used to vulcanize and mold a tire, comprising:
    sectors divided in a tire circumferential direction and molding a tread portion of the tire; and
    a pair of upper and lower side plates molding a sidewall portion of the tire, wherein;
    mold parting lines formed by the sectors and the pair of the upper and lower side plates are located in the tread portion;
    a lateral groove molding rib molding a lateral groove in the tread portion is provided to bridge from one of the sectors to the respective side plate and a protrusion molding recess used to mold a protrusion at a groove bottom of the lateral groove is provided to the lateral groove molding rib; and
    a mold parting plane including the mold parting line is provided to divide the lateral groove molding rib at a position where the protrusion molding recess is not provided and an evacuation path from the protrusion molding recess to the mold parting plane is provided to the lateral groove molding rib.

2. The tire vulcanization mold according to claim 1, wherein:
    the protrusion molding recess includes multiple protrusion molding recesses, which are provided to the lateral groove molding rib and the mold parting plane is set to pass a space between the protrusion molding recesses situated adjacently; and
    the evacuation path is provided at least from one protrusion molding recess to the mold parting plane.

3. The tire vulcanization mold according to, claim 2, wherein:
    the evacuation path is provided from the protrusion molding recesses on both sides of the mold parting plane to the mold parting plane.

4. The tire vulcanization mold according to claim 1, wherein:
    the evacuation path is a cylindrical hollow.

5. The tire vulcanization mold according to claim 1, wherein:
    the evacuation path is a conical hollow.

6. The tire vulcanization mold according to claim 1, wherein:
    the evacuation path is of a slit shape.

7. The tire vulcanization mold according to claim 1, wherein:
    a distance from the protrusion molding recess to the mold parting plane is 5 mm or less.

8. A tire vulcanization device, comprising:
    the tire vulcanization mold set forth in claim 1;
    a segment fixed to each sector and moving each sector in a tire radial direction; and
    a pair of upper and lower attachment plates fixed to the pair of the upper and lower side plates, respectively, and supporting the segment in a slidable manner.

9. The tire vulcanization device according to claim 8, wherein:
    the segment includes a pair of upper and lower sliding surfaces sliding on the pair of the upper and lower attachment plates, respectively;
    the pair of the upper and lower sliding surfaces radially outwardly inclines toward a center in a tire width direction; and
    when the segment moves the sector outward in the tire radial direction, the pair of the upper and lower sliding surfaces slides on the pair of the upper and lower attachment plates, respectively, and spacings at the mold parting planes widen.

10. The tire vulcanization device according to claim 9, wherein:
    the mold parting planes are provided parallel to the tire radial direction.

11. A tire production method, comprising:
    a forming step of forming a green tire; and
    a vulcanizing step of vulcanizing and molding the green tire by using the tire vu can iza 0 device set forth in claim 8.

12. A tire production method, comprising:
    a forming step of forming a green tire; and
    a vulcanizing step of vulcanizing and molding the green tire by using the tire vulcanization device set forth in claim 9.

13. A tire production method, comprising:
    a forming step of forming a green tire; and
    a vulcanizing step of vulcanizing and molding the green tire by using the tire vulcanization device set forth in claim 10.

* * * * *